US005844984A

United States Patent [19]

Yamaguchi et al.

[11] Patent Number: 5,844,984

[45] **Date of Patent: *Dec. 1, 1998**

[54] TWO-WAY COMMUNICATIONS EARSET WITH FILTER

[75] Inventors: Noboru Yamaguchi, Yokohama; Masao Konomi, Tokyo, both of Japan

[73] Assignee: Pan Communications, Inc., Tokyo, Japan

[ * ] Notice: The term of this patent shall not extend beyond the expiration date of Pat. No. 5,448,637.

[21] Appl. No.: 347,189

[22] Filed: Nov. 21, 1994

Related U.S. Application Data

[63] Continuation of Ser. No. 34,840, Mar. 19, 1993, abandoned.

[30] Foreign Application Priority Data

Mar. 19, 1992 [JP] Japan .................................... 4-092457

[51] Int. Cl.$^{6}$ ............................. H04M 1/00; H04R 25/00

[52] U.S. Cl. ............................................. 379/430; 381/380

[58] Field of Search ..................................... 379/430, 433; 381/68.2, 68.6, 69, 159, 158, 108, 94, 98, 380, 385

[56] References Cited

U.S. PATENT DOCUMENTS

| | | | |
|---|---|---|---|
| 2,255,249 | 9/1941 | Greibach . | |
| 3,197,576 | 7/1965 | Martin | 381/68.6 |
| 3,258,533 | 6/1966 | Bredon . | |
| 3,385,937 | 5/1968 | Lafon | 381/68.2 |
| 3,588,382 | 6/1971 | Reedyk . | |
| 3,732,446 | 5/1973 | Bryant | 381/173 |
| 3,863,027 | 1/1975 | Acks | 381/94 |
| 3,869,584 | 3/1975 | Wilde . | |
| 3,876,843 | 4/1975 | Moen . | |
| 3,927,279 | 12/1975 | Nakamura et al. | 381/68.2 |
| 3,963,881 | 6/1976 | Fraim et al. . | |
| 4,006,318 | 2/1977 | Sebesta et al. | 381/158 |
| 4,009,355 | 2/1977 | Poradowski . | |
| 4,017,797 | 4/1977 | Laessig | 325/16 |
| 4,453,046 | 6/1984 | Fidi et al. | 381/169 |
| 4,489,442 | 12/1984 | Anderson et al. | 381/81 |
| 4,517,415 | 5/1985 | Laurence | 381/68.2 |
| 4,591,668 | 5/1986 | Iwata . | |
| 4,654,883 | 3/1987 | Iwata | 379/430 |
| 4,696,045 | 9/1987 | Rosenthal | 381/114 |
| 4,720,857 | 1/1988 | Burris et al. | 381/187 |
| 4,862,509 | 8/1989 | Towsend | 381/163 |
| 4,975,966 | 12/1990 | Sapiejewski | 381/158 |
| 5,109,410 | 4/1992 | Suhami et al. | 379/430 |
| 5,134,659 | 7/1992 | Moseley | 381/72 |
| 5,164,984 | 11/1992 | Suhami et al. | 379/444 |
| 5,210,803 | 5/1993 | Martin et al. | 381/68.2 |
| 5,280,524 | 1/1994 | Norris | 379/430 |
| 5,363,444 | 11/1994 | Norris | 379/430 |

FOREIGN PATENT DOCUMENTS

| | | |
|---|---|---|
| A-0237454 | 9/1987 | European Pat. Off. . |
| A-3627002 | 2/1988 | Germany . |
| A-1530814 | 11/1978 | United Kingdom . |

OTHER PUBLICATIONS

SAMS, Understanding Telephone Electronics, Copyright 1983, 1984.

Miles, U.S. Statutory Invention Registration No. H417, "Headset for Ambient Noise Suppression," published Jan. 5, 1988.

Carter, "Active Noise Reduction," Bose Corporation, Aerospace Medical Research Laboratory, Wright Patterson Air Force Base, Ohio, Jan. 1984.

*Primary Examiner*—Jack Chiang
*Attorney, Agent, or Firm*—Finnegan, Henderson, Farabow, Garrett & Dunner, LLP

[57] ABSTRACT

A two way voice communications earset which is situated in the ear of the user and which includes a filter in an audio signal loop coupling a microphone and a speaker of the earset.

16 Claims, 5 Drawing Sheets

TWO-WAY COMMUNICATIONS EARSET WITH FILTER

This application is a continuation, of application Ser. No. 08/034,840 filed Mar. 19, 1993, now abandoned.

BACKGROUND OF THE INVENTION

The present invention relates generally to a two-way communications earset with a filter which is worn in or at the ear of the user for use in two-way voice communications and which is operated hands-free. The earset can transmit the user's voice and receive the voice signals of another party simultaneously without causing feedback.

Modern wireless technologies have advanced to the extent that portable, wireless and mobile telephones have become small in size and are used widely. Such portable telephones typically include a handset requiring the use of at least one hand for communication.

A disadvantage of the handset type of telephone is that they are inconvenient to use in front of a computer or while driving a car. In such instances, the user must use a hand to hold the handset while typing at the keyboard, which is very difficult to do, or while holding the steering wheel of a car, which is dangerous. Alternatively, the user must hold the telephone handset to their ear with their shoulder, which is very uncomfortable.

In order to solve this drawback, hands-free telephones have been developed. A conventional two-way communications apparatus used with hands-free telephones comprises a headband including a speaker positioned in front of one ear and a boom attached to the headband with a small microphone at one end of the boom. With the boom connected to the headband, the microphone extends in front of the mouth of the user. However, this type of hands-free telephone is not convenient to use because it is cumbersome and because it disturbs the hair of the user.

Another conventional two-way communications system used with hands-free telephones includes a structure which hangs from the ear of the user. This type of communications system includes a speaker positioned in front of the user's ear and a boom having a microphone extending in front of the mouth of the user. Again, such a structure is not convenient for the user because it typically does not hang well at the ear and because it is bulky to carry owing to the boom.

Yet another conventional two-way communication system comprises a speaker and a microphone both housed in an earset unit which is worn in the ear of the user. Such an earset does not require use of hands to operate and does not have a boom extending in front of the user's mouth. However, a drawback of this earset is that users cannot increase the sound volumes of either the speaker or the microphone. Therefore, the use of this type of earset is limited to quiet environments.

In addition, microphone sensitivity in such conventional earsets is set to a low level. As a result, the user is difficult to hear. Also, because the sensitivity of the speaker is set at a low level as well, the user tends to cover the earset with a hand in order to obtain improved communications in a noisy environment. However, this tends to cause feedback. Because of these drawbacks, conventional earsets include a warning regarding the tendency for feedback and are not widely used.

Accordingly, an object of the present invention is to provide an earset for use in two-way voice communications which is worn in or at the ear of the user and which is operated hands-free.

Another object of the present invention is to provide an earset which transmits the user's voice and receives voice signals from another party simultaneously without feedback caused by acoustic or mechanical coupling between the speaker and the microphone.

A further object of the present invention is to provide an earset which delivers an adequate level of sound to the user without causing feedback, while also delivering an adequate level of sound to a receiver at the other end of the communication system.

A still further object of the present invention is to provide an earset which includes a mechanical or electrical filter that eliminates audio frequencies tending to cause feedback.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the objects in accordance with the purposes of the present invention, as embodied and described herein, the earset of the present invention comprises a two-way simultaneous voice transmitting and receiving device comprising a case comprising an enlarged portion adapted to be placed in an ear auricle of a user and a hollow portion extending along a direction parallel to a mouth of the user, wherein the enlarged portion houses a speaker with an output led to an ear canal of the user and the hollow portion houses a microphone, and means, situated within an audio signal loop coupling the speaker to the microphone, for filtering a high end range of audio frequencies that causes feedback.

The present invention further comprises a two-way simultaneous voice transmitting and receiving device comprising a case including an enlarged portion adapted to be placed in an auricle of a user's ear and a hollow portion extending parallel to a mouth of the user, wherein the hollow portion houses a microphone, and the enlarged portion houses a speaker with an output to an ear canal of the user, wherein the speaker passes frequencies in a range of 300 to 1000 Hz and has a high end cut off frequency below 2.5 KHz.

Alternatively, the present invention comprises a two-way simultaneous voice transmitting and receiving device comprising a case including an enlarged portion adapted to be placed in an auricle of a user's ear and a hollow portion extending parallel to a mouth of the user, wherein the enlarged portion houses a speaker with an output led into an ear canal of the user, and the hollow portion houses a microphone, and wherein the microphone passes frequencies in a range of 300 to 1000 Hz and has a high end cut off frequency below 2.5 KHz.

BRIEF DESCRIPTION OF THE DRAWINGS

The accompanying drawings, which are incorporated in and constitute a part of the specification, illustrate the presently preferred apparatus of the present invention and, together with the general description given above and the detailed description of the preferred embodiments given below serve to explain the principles of the invention. In the drawings.

DETAILED DESCRIPTION OF THE PREFERRED EMBODIMENTS

Figure 1:
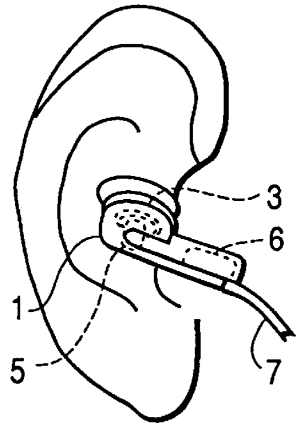
FIG. 1 is a side view of an earset according to a first embodiment of the present invention inserted in the ear of a user.
Figure 2:
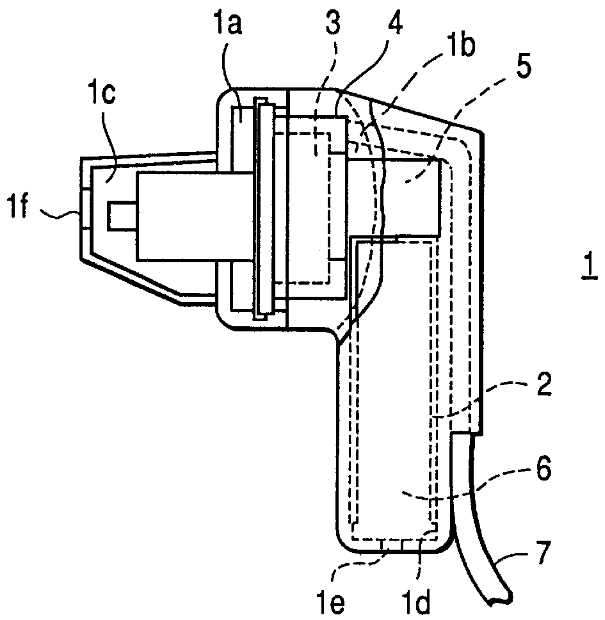
FIG. 2 is sectional view of the first embodiment.

A first embodiment of the earset according to the present invention is described with reference to FIGS. 1 and 2. As shown in FIGS. 1 and 2, the earset 1 has an L-shaped configuration and is preferably made of plastic. The short arm of the L-shaped earset 1 includes an enlarged portion 1*a* which is inserted in the ear canal of the user. The enlarged portion 1*a* includes an earset component portion 1*b* and an insertion portion 1*c*.

The enlarged portion la is placed in the ear auricle of the user and the insertion portion 1*c* is inserted into the ear canal. The insertion portion 1*c* is preferably shaped so that the ear canal of the user will not be completely clogged by the device and so that the device will not be so loose that feedback due to leaked sound is caused.

A speaker 3 is housed in the earset component portion lb. and is supported by resilient material 4. The output of the speaker 3 is input to the insertion part 1*c* and is fed into the ear canal of the user. The speaker 3 can preferably be either a magnetic-type speaker or dynamic-type speaker. As shown in FIGS. 1 and 2, the speaker 3 is situated in the earset component portion 1*b*. However, in accordance with the present invention, the speaker 3 can be placed in an alternate location, so long as the output from the speaker 3 is guided into the ear canal of the user.

The long arm of the L-shaped earset 1 preferably includes a hollow portion 1*d* which has a small hole 1*e* at the lower end thereof and an electret type microphone 5 at an upper portion thereof. In accordance with the present invention, the microphone 5 can be either a bidirectional-type or a unidirectional-type microphone. A sound pipe 2 is also contained within the hollow portion 1*d* and connects the small hole 1*e* and the microphone 5. In operation, the microphone 5 detects the voice signals of the user through the small hole 1*e* and the sound pipe 2.

In the embodiment shown in FIGS. 1 and 2, a filter 6 is placed within the sound pipe 2 and is situated between the microphone 5 and the small hole 1*e*. The filter 6 passes audio frequencies within a preferred range of 300 to 1000 Hz with a cut off frequency of preferably below 2.5 KHz, as described in greater detail below. Additionally, as also described in more detail below, the filter 6 can be located at alternate locations in the earset. A wire 7 extends through the hollow portion 1*d* and combines the wires from the speaker 3 and the microphone 5.

The earset 1 is operated in the following manner. When the earset 1 is situated in the ear of the user, electrical signals which are received are fed via the wire 7 to the speaker 3. The speaker 3 emits sound to the ear canal of the user via a hole If in the insertion portion 1*c*.

The voice signal of the person using the earset 1 passes through the small hole 1*e* and filter 6 and reaches the microphone 5. The microphone 5 converts the sound to electrical signals that are sent via the wire 7 to an amplifier, which is not shown in FIGS. 1 or 2.

Figure 3:
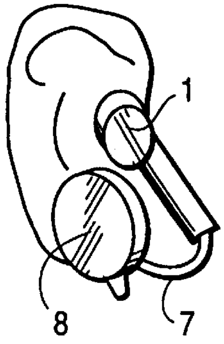
FIG. 3 is a side view of an earset according to a second embodiment of the present invention inserted in the ear of a user.

FIG. 3 shows a second embodiment of an earset according to the present invention. As shown in FIG. 3, the device has a two-piece construction including a two-way wireless communication device 8 connected to an earset 1. The communication device 8 includes a transmitter/receiver at the front portion of the ear lobe. The communication device also includes a battery cell located at the back portion of the ear lobe. The battery cell and the transmitter/receiver remain connected to the ear lobe by a pinching mechanism located therebetween. The earset 1, shown in FIG. 3, is substantially the same as that shown in FIGS. 1 and 2.

In order to design the earset 1 of the present invention so that it most efficiently conducts two-way voice communications, the unique sound field around the auricle of the ear was studied by the inventors of the present invention. This sound field was found to extend not only in front of the auricle, but also in the area surrounding the auricle and to result from a combination of the sound near the auricle, the ear canal and the head. It was also determined that the sound field generates sound reflection, diffraction and resonance.

As a result of the inventors' study of the sound field, acoustic and mechanical coupling between the speaker 3 and the microphone 5 was determined to increase selectively at a few specific frequencies between 1 KHz and 3.4 KHz. These specific frequencies vary depending on the type of earset worn by the user and the voice characteristics of the user.

It was also observed that when the sound volume of the speaker 3 is increased and when the sensitivity of microphone 5 is increased, feedback tends to occur at the identified specific frequencies. In addition, when the earset 1 is used under heavy ambient noise, the user tends to cover the ear containing the earset 1 with his hand in order to block out the ambient noise. However, such hand placement acts as an ear muff and presents the optimal condition for feedback to occur at these specific frequencies. Feedback between the speaker 3 and the microphone 5 also occurs when a portion of the voice output of speaker 3 is leaked. This leaked portion is reflected off the auricle structure of the ear and input to the microphone 5 via the small hole 1*e*.

In order to reduce the deleterious affects of acoustic coupling and feedback described above, signals within the area of the specific frequencies are reduced. Although it is well known that reducing signals within a certain frequency range can damage the quality of voice communications, according to the present invention, the specific identified frequencies can be reduced without lowering the quality of voice communications. Additionally, acoustic coupling and feedback can also be significantly reduced.

Specifically with respect to reducing the identified frequencies, the inventors of the present invention found that if the high end cut off frequency was made too low, the quality of voice communications would be unacceptable. Conversely, if the high end cut off frequency was set too high, feedback occurred too readily. The inventors also considered that when sound passes from a free sound field to the ear drum, the sound pressure of signals between 1 KHz to around 2.5 KHz increases.

By balancing the effects of acoustic and mechanical coupling, the likelihood of feedback, and sound pressure with an acceptable level of voice communication, according to the present invention, the filter 6 preferably is configured to pass frequencies in the range of 300 to 1000 Hz and to preferably have a high end cut off frequency of below 2.5 KHz.

Additionally, the filter 6 is situated in the earset 1 in an audio signal loop coupling the speaker 3 and the microphone 5. The audio signal loop is defined as electrical or mechanical connection between the speaker 3 and the microphone 5. By placing the filter anywhere within the audio signal loop, feedback between the speaker 3 and microphone 5 can be substantially reduced.

Several different placements of the filter 6 are contemplated. For example, with the filter 6 coupled to the speaker 3, the speaker 3 will preferably have output characteristics that pass low frequencies in the range of 300 Hz to 1,000 Hz and have a high end cut-off frequency of below 2.5 KHz. Alternatively, with the filter 6 coupled to the microphone 5, electrical signals from the microphone 5 will preferably have signal characteristics that pass low frequencies in the range of 300 Hz to 1,000 Hz and have a high end cut-off frequency of below 2.5 KHz. And alternatively, two or more filters with portions of the desired frequency response can be allocated between the speaker 3 and microphone 5 in the audio signal loop.

In addition to reducing acoustic coupling and feedback and producing an acceptable voice signal, it is desirable that the earset 1 in of the present invention be sensitive to human voice signals, but not to ambient noise or noise that is leaked from the speaker 3. Because the earset 1 is small in size and is mounted at the entrance of the ear canal of the user, it is preferable that the earset 1 have a structure which provides a greater sensitivity to voice signals and a lesser sensitivity to sound reaching the earset 1 from other directions.

Figure 4:
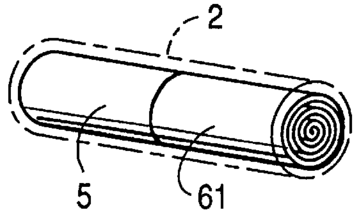
FIG. 4 is a sectional view of a mechanical filter used in the earset according to the present invention.

To achieve this result, mechanical filter 61 is used to improve the directional sensitivity of the earset 1. FIG. 4 is a side view of a mechanical filter 61 which may be employed in the earset 1 shown in FIGS. 1–3. As shown in FIG. 4, the filter 61 is preferably made of a fiber sheet coiled so that the sheet fits into the cylindrically shaped hollow portion 1*d*.

Preferably, the filter 61 comprises a coil of highly fibrous paper tightly wound and filling the hollow portion 1*d*, which preferably has a diameter of 6 mm. The mechanical filter 61 is constructed so that it has the frequency characteristics described above. The resultant frequency characteristic can be varied by changing the density of the coil, ie., reducing the number of coils.

With such a coiled structure, sound coming from a direction parallel to the axis of the mechanical filter 61 passes through to microphone 5 with less attenuation than sound coming from other directions. Because voice signals coming from the user primarily emanate along an axis parallel to the axis of the mechanical filter 61, these signals are less attenuated than those of other signals reaching the microphone 5 and the sensitivity to voice signals is therefore improved.

In the embodiment of the mechanical filter 6 shown in FIG. 3, the structure of the coiled fiber sheet achieves the desired frequency response and improves the sensitivity of the earset 1 to voice signals. Alternatively, the mechanical filter 61 may be constructed of glass wool, rock wool, felt, materials such as high density sponge, or fibres made of cotton and pulp. More specifically, the mechanical filter 61 may comprise a cigarette filter, comprising cotton fibers, because it has been found that cigarette filters can achieve the desired frequency characteristics. Additionally, a cigarette filter fits within the hollow portion 1*d* and are readily available.

It should also be noted that FIGS. 1 and 2 show an embodiment in which a mechanical filter 6 is positioned in front of microphone 5. However, as discussed above, a mechanical filter 6 with a similar frequency response can alternatively be placed in front of the speaker 3. It is also contemplated that a first mechanical filter 6 with a portion of the desired filter characteristics be placed in front of the microphone 5 while another mechanical filter 6, having another portion of the desired frequency response, be positioned in front of the speaker 3.

Figure 5A:
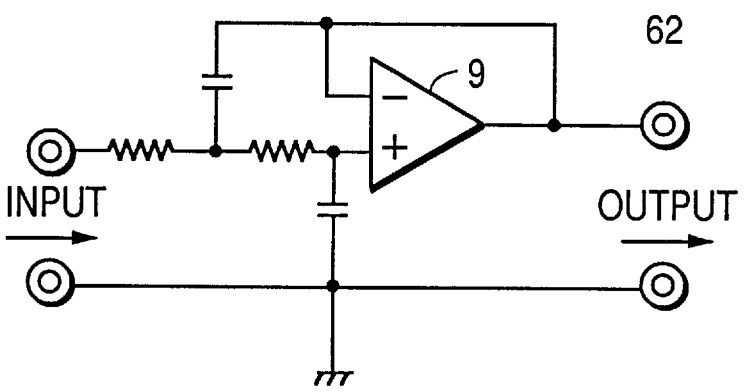
FIG. 5A is a circuit diagram of low pass electrical filter used in the earset according to the present invention.
Figure 5B:
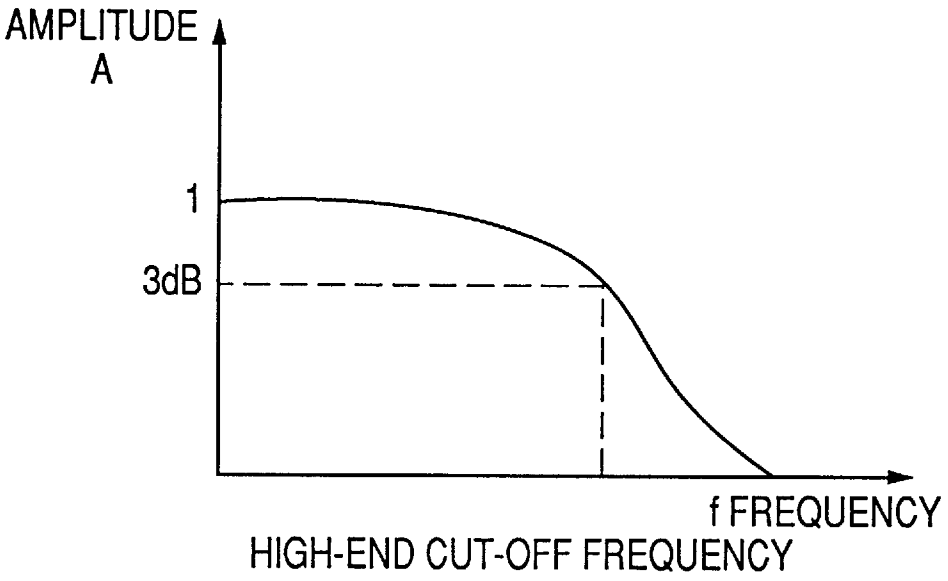
FIG. 5B is a graphical representation of the frequency characteristics of the low pass electrical filter shown in FIG. 5A.
Figure 6A:
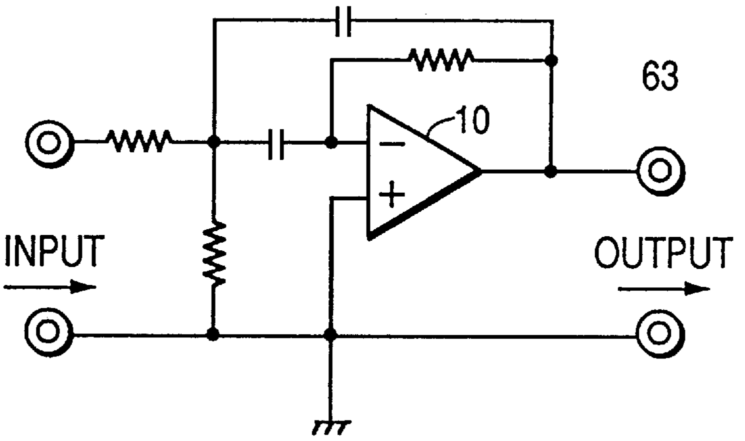
FIG. 6A is a circuit diagram of a band pass electrical filter used in the earset according to the present invention.
Figure 6B:
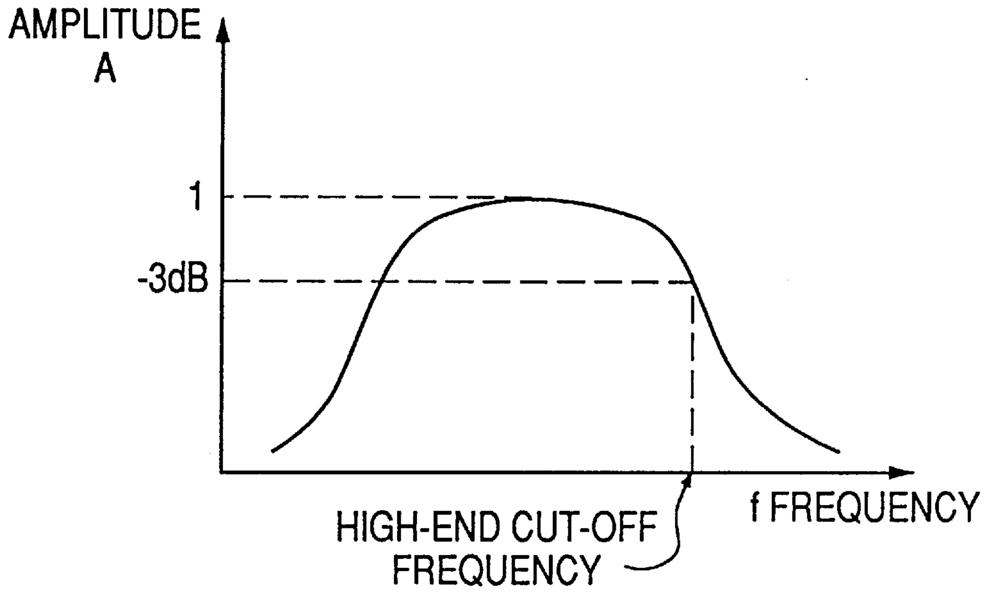
FIG. 6B is a graphical representation of the frequency characteristics of the band pass electrical filter shown in FIG. 6A.

Alternatively, the filter 6 may preferably comprise electrical components, as shown in FIGS. 5A and 6A. FIG. 5A shows a low pass filter 62 comprising an operational amplifier 9 which can be used as the filter 6 of the earset 1. FIG. 6A shows a band pass filter 63 also comprising an operational amplifier 10 which can be used as the filter 6 of the earset 1. FIG. 5B and FIG. 6B show the frequency responses of the filters shown in FIG. 5A and FIG. 6A, respectively.

Preferably, the operational amplifier may comprise a National Semiconductor LM324 type operational amplifier although alternative devices are known or can be designed by those of ordinary skill in the art. Additionally, as described with the mechanical filter 61, the low pass filter 62 and the band pass filter 63 are preferably placed in the audio loop between the speaker 3 and the microphone 5.

As described above, according to the present invention, the high end cut off frequency of the filter 6 is preferably below 2.5 KHz. When one of the low pass filter 62 or the band pass filter 63 are used as the filter 6 of the earset 1, a determination of the high end cut off frequency is made depending on the characteristics of the filter 6. That is, the high end cut off frequencies for a frequency band with or without amplitude ripple, as shown in FIG. 7 and FIG. 8, respectively, will be different.

Figure 7:
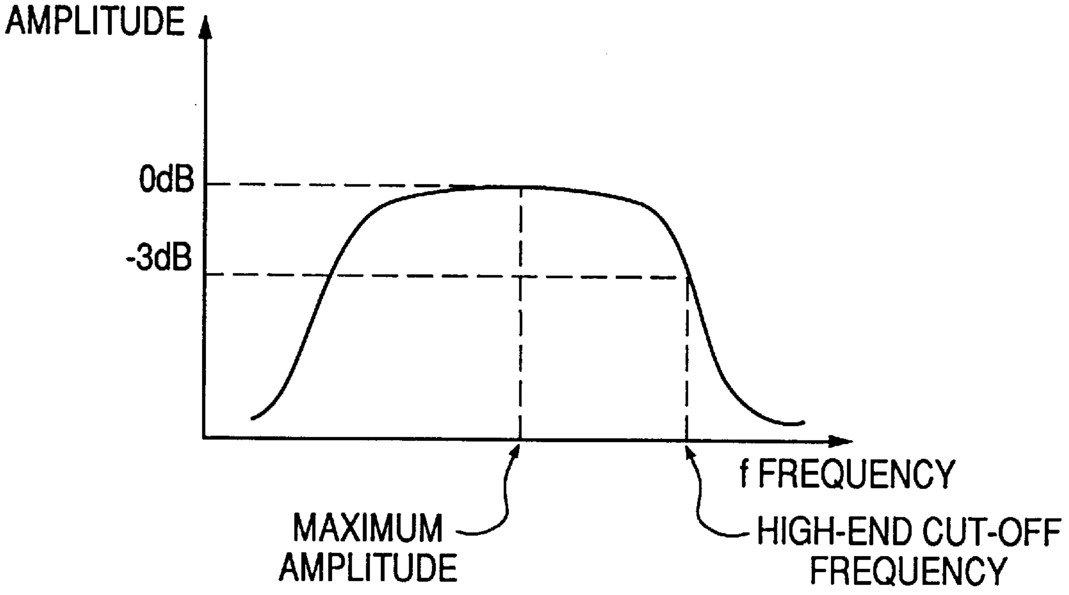
FIG. 7 is a graphical representation showing the definition of the cut off frequency within the frequency band without ripple.
Figure 8:
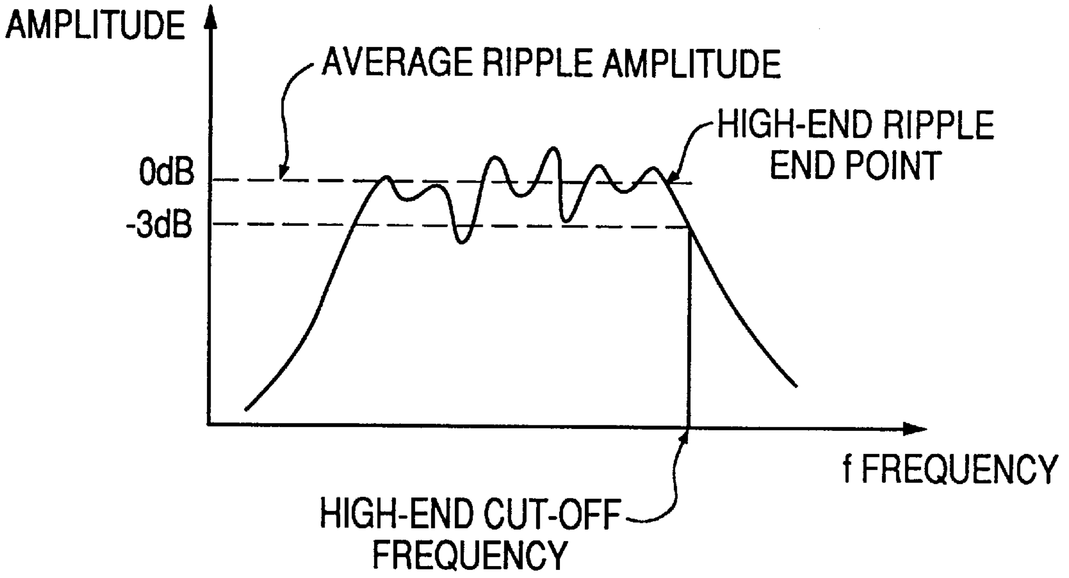
FIG. 8 is a graphical representation showing the definition of the cut off frequency within the frequency band with ripple.

More specifically, in accordance with the present invention, the high end cut off frequency of the low pass or band pass filters 62 and 63 shown, respectively, in FIGS. 5A and 6A is defined such that if the filter 6 does not have a ripple characteristic within the frequency range allowed to pass therethrough, as shown in FIG. 7, the cut-off frequency of the filter 6 is defined as that after which an output from the filter 6 becomes 3 dB below the maximum amplitude within the allowable frequency range. Alternatively, if the filter 6 does have a ripple characteristic within the frequency range allowed to pass therethrough, as shown in FIG. 8, the cut-off frequency is defined as that frequency after which an output from the filter 6 becomes 3 dB below the average amplitude within the allowed frequency range.

However, constructed as shown in FIGS. 5A and 6A, the filters 62 and 63, may cut off certain high frequency components of the speech signals and may therefore deteriorate voice communications. In order to make up for this, an alternative filter 64 which includes a compensating circuit can be used.

Figure 9A:
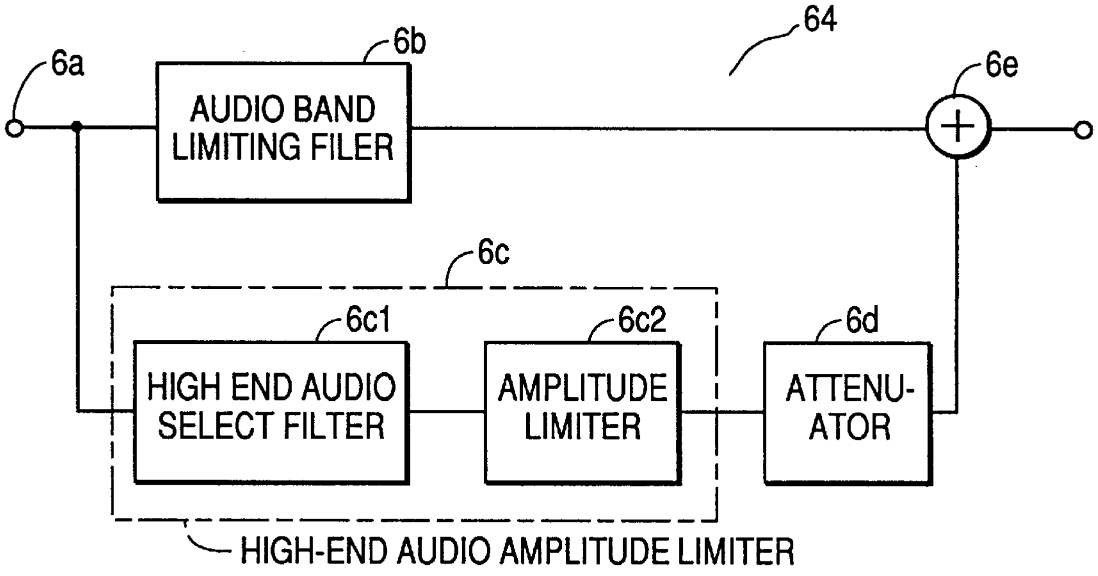
FIG. 9A is a block diagram of a frequency compensating filter.
Figure 9B:
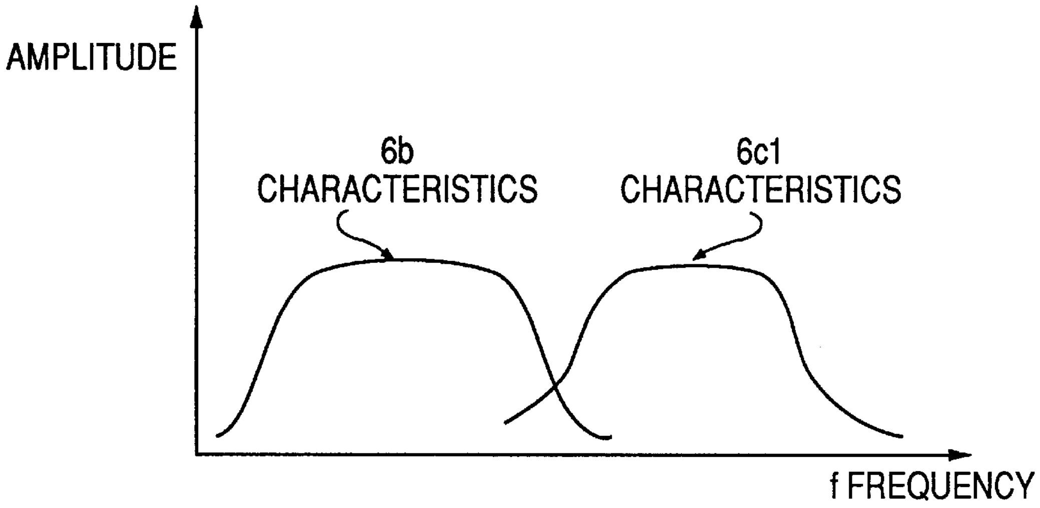
FIG. 9B is a graphical representation of the frequency characteristics of the compensating electrical filter shown in FIG. 9A.

FIG. 9A is a circuit diagram of such a compensation filter 64. The compensating filter 64 shown in FIG. 9A, improves the loss of high frequencies which may be filtered out by filters 62 and 63, shown in FIGS. 5A and 6A. FIG. 9B is a graphical representation of the frequency response of the circuit shown in FIG. 9A.

More specifically, in operation, the microphone 5 of the earset 1, shown in FIGS. 1–3, produces an electrical signal output 6*a*. Output 6*a* is fed into audio band limiting filter 6*b* which as shown in FIG. 9B produces a band pass filter response similar to that shown in FIG. 6B. It is also contemplated that the output 6*a* can emanate from the speaker 3.

The output 6*a* is also input to high end audio select filter 6*c*1 of the high end audio amplitude limiter 6*c*. The high end audio select filter 6*c*1 passes selected high end audio frequencies. The frequency response of the high end audio select filter 6*c*1 is shown in FIG. 9B. The output of the high end audio select filter 6*c*1 is fed into amplitude limiter 6*c*2 which limits the output of the high end audio select filter to a predetermined level. The output of the amplitude limiter 6*c*2 is fed into attenuator 6*d*. The outputs of audio band limiting filter 6*b* and attenuator 6*d* are added by the adder 6*e*.

A graphical representation of the frequency response of the filter 64, shown in FIG. 9A, is shown in FIG. 9B. The frequency response includes the both the 6*b* characteristics, the output from the audio band limiting filter, and the 6*c*1 characteristics, the output from the attenuator 6*d*. Accordingly, with the filter 64 of the present invention, the amplitudes of high frequencies are controlled below a certain level by amplitude limiter 6*c*2 so that feedback will not occur. In addition, because some high frequencies are left in the resultant output signal, as a result of the addition of high end signals to those of the audio band limiting filter 6*b*, the resultant voice signal will not be deteriorated.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A two-way simultaneous voice transmitting and receiving device comprising:

a case comprising:

an enlarged portion adapted to be placed in an ear auricle of a user, the enlarged portion including an insertion portion adapted to be inserted in an ear canal of the user, and a hollow portion extending in a direction away from the ear, wherein the enlarged portion houses a speaker with an output led directly to the ear canal of the user and the hollow portion houses a microphone with a sole audio inlet comprising a hole, and wherein said case is configured to offset said hole of said sole audio inlet relatively far from the mouth of the user; and filter means, comprising sound absorbing material having substantial thickness positioned in the hollow portion between the hole of the sole audio inlet and a diaphragm of the microphone, for reducing feedback between the speaker and the microphone.

2. A two-way simultaneous voice transmitting and receiving device comprising:

a case comprising:

enlarged portion adapted to be placed in an ear auricle of a user, the enlarged portion including an insertion portion adapted to be inserted in an ear canal of the user, and a hollow portion extending in a direction away from the ear, wherein the enlarged portion houses a speaker with an output led directly to the ear canal of the user and wherein the hollow portion houses a microphone with a sole audio inlet comprising a hole; and filter means, comprising fibrous sound absorbing material and having substantial thickness positioned in the hollow portion between the hole of the sole audio inlet and a diaphragm of the microphone, for reducing feedback between the speaker and the microphone, wherein the hole of the sole audio inlet and the sound absorbing material provide sound directivity to voice signals of the user, the sound absorbing material having an axis centered on the hole and being elongated along the axis.

3. The two-way simultaneous voice transmitting and receiving device according to claim 1, wherein the sound-absorbing material comprises one of a coiled fiber sheet, glass wool, rock wool, felt, a high-density sponge, cotton fibers, and pulp fibers.

4. The two-way simultaneous voice transmitting and receiving device according to claim 2, wherein the sound-absorbing material comprises one of a coiled fiber sheet, glass wool, rock wool, felt, a high-density sponge, cotton fibers, and pulp fibers.

5. A two-way simultaneous voice transmitting and receiving device comprising:

a case comprising:

an enlarged portion adapted to be placed in an ear auricle of a user, the enlarged portion including an insertion portion adapted to be inserted in an ear canal of the user, and a hollow portion extending in a direction away from the ear, wherein the enlarged portion houses a speaker with an output led directly to the car canal of the user and the hollow portion houses a microphone with a sole audio inlet comprising a hole, said case being configured to offset said hole of said sole audio inlet relatively far from the mouth of the user; and filter means, comprising fibrous sound absorbing material having substantial thickness and positioned in the hollow portion between the hole of the sole audio inlet and a diaphragm of the microphone, for reducing feedback between the speaker and the microphone, wherein the hole of the sole audio inlet and the sound absorbing material provide sound directivity to voice signals of the user, the sound absorbing material having an axis centered on the hole and being elongated along the axis.

6. The two-way simultaneous voice transmitting and receiving device according to claim 5, wherein the sound-absorbing material comprises one of a coiled fiber sheet, glass wool, rock wool, felt, a high-density sponge, cotton fibers, and pulp fibers.

7. The two-way simultaneous voice transmitting and receiving device as recited in claim 1, wherein the filter means comprises a coil having a diameter of approximately 6 mm.

8. The two-way simultaneous voice transmitting and receiving device as recited in claim 1, wherein the filter means passes audio frequencies in a range of approximately 300 Hz to 1000 Hz and has a high end cut off frequency below approximately 2.5 KHz.

9. The two-way simultaneous voice transmitting and receiving device as recited in claim 1, wherein the case has an L-shaped configuration.

10. The two-way simultaneous voice transmitting and receiving device as recited in claim 1, wherein a short arm of the L-shaped configuration includes the enlarged portion.

11. The two-way simultaneous voice transmitting and receiving device as recited in claim 10, wherein the enlarged portion further includes an earset component portion.

12. The two-way simultaneous voice transmitting and receiving device as recited in claim 1, wherein a long arm of the L-shaped configuration includes the hollow portion, wherein the microphone is located at a first end of the hollow portion and the hole is located at the second end of the hollow portion.

13. The two-way simultaneous voice transmitting and receiving device as recited in claim 1, wherein the hollow portion comprises a sound pipe.

14. The two-way simultaneous voice transmitting and receiving device as recited in claim 13, wherein the filter means is placed within the sound pipe and is situated between the microphone and the hole.

15. The two-way simultaneous voice transmitting and receiving device as recited in claim 1, wherein a diameter of the insertion portion is smaller than a diameter of the enlarged portion.

16. The two-way simultaneous voice transmitting and receiving device as recited in claim 1, wherein an output of the speaker is input to the insertion portion and fed into the ear canal of the user.

* * * * *